United States Patent
Ladic et al.

(10) Patent No.: US 8,683,461 B2
(45) Date of Patent: Mar. 25, 2014

(54) SYSTEM AND METHOD FOR DEPLOYMENT OF CONFIGURATION AND ANALYSIS SOFTWARE

(75) Inventors: Lance Anthony Ladic, Robbinsville, NJ (US); John Pearson, Lawrenceville, NJ (US); David Rapaport, Marlboro, NJ (US); Lawrence Tarbox, Eureka, MO (US); Gianluca Paladini, Skillman, NJ (US)

(73) Assignee: Siemens Corporation, Iselin, NJ (US)

( * ) Notice: Subject to any disclaimer, the term of this patent is extended or adjusted under 35 U.S.C. 154(b) by 1470 days.

(21) Appl. No.: 11/326,232

(22) Filed: Jan. 5, 2006

(65) Prior Publication Data
US 2006/0130058 A1 Jun. 15, 2006

Related U.S. Application Data

(63) Continuation of application No. 10/953,593, filed on Sep. 29, 2004, now abandoned.

(60) Provisional application No. 60/506,890, filed on Sep. 29, 2003.

(51) Int. Cl.
*G06F 9/445* (2006.01)

(52) U.S. Cl.
USPC ........... 717/174; 717/175; 717/176; 717/177; 717/178

(58) Field of Classification Search
None
See application file for complete search history.

(56) References Cited

U.S. PATENT DOCUMENTS

| 5,912,942 | A | * | 6/1999 | Schick et al. | 378/98.8 |
|---|---|---|---|---|---|
| 5,933,646 | A | * | 8/1999 | Hendrickson et al. | 717/169 |
| 6,325,540 | B1 | * | 12/2001 | Lounsberry et al. | 378/207 |
| 6,708,327 | B1 | * | 3/2004 | Aliphas | 717/125 |
| 2002/0003179 | A1 | * | 1/2002 | Verhoff et al. | 241/21 |
| 2009/0131756 | A1 | * | 5/2009 | Nemoto | 600/300 |

\* cited by examiner

*Primary Examiner* — Qamrun Nahar
(74) *Attorney, Agent, or Firm* — Donald B. Paschburg; F. Chau & Associates, LLC (57) ABSTRACT

The present invention discloses a method and system for deploying software, e.g., software modules designed for acquisition and/or post-processing of images related to a particular imaging agent. The modules can be remotely accessed from a software server.

63 Claims, 4 Drawing Sheets

FIG. 4

SYSTEM AND METHOD FOR DEPLOYMENT OF CONFIGURATION AND ANALYSIS SOFTWARE

CROSS-REFERENCE TO RELATED APPLICATIONS

The present patent application is a Continuation of U.S. patent application Ser. No. 10/953,593, filed on Sep. 29, 2004 now abandoned, and entitled "SYSTEM AND METHOD FOR DEPLOYMENT OF CONFIGURATION AND ANALYSIS SOFTWARE", which claims the benefit of U.S. Provisional Application No. 60/506,890 filed on Sep. 29, 2003, which is incorporated by reference herein in its entirety.

FIELD OF THE INVENTION

The present invention relates generally to a system and method for deploying software. More specifically, the present invention discloses a system and method for deploying configuration and/or analysis software, e.g., software deployed within an imaging system for conducting an imaging examination using an imaging agent, e.g., a molecular imaging agent.

BACKGROUND OF THE INVENTION

One of the latest trends in medical diagnosis and treatment is molecular imaging. In molecular imaging, specialized imaging agents or chemical compounds are utilized during a medical imaging procedure for highlighting particular cellular or molecular processes relating to a particular disease state. The molecular imaging agent manufacturer generally recommends a preferred set of acquisition and processing parameters that best enable the analysis of the imaging data. Additionally, post processing is often employed to enhance the physician's perception of clinically relevant features revealed in the imaging data and to quantify the activity level of the molecular imaging agent. In many cases, the post processing methods are customized for a particular molecular imaging agent.

Many research groups and pharmaceutical companies are developing molecular imaging agents that target a specific disease state. It is likely that hundreds to thousands of such agents could have significant clinical utility and be essential to advance personalized medicine. However, the sheer number of these molecular imaging agents and the likelihood that most of them will require the development of complex agent-specific acquisition and image processing applications create serious impediments to the development of molecular imaging agents for clinical applications. Some of these impediments stem from the fact that the architecture and user interfaces of existing commercial platforms may not scale to support a large number of molecular imaging applications, and the expense of developing such large number of applications may be prohibitive, especially to provide for equivalent functionality across the major workstation platforms.

Moreover, the essential step of clinical validation often performed at research hospitals can be a bottleneck. Since commercial imaging workstations in use in the clinic are "closed", and do not support rapid prototyping and experimentation, the clinical research groups must develop independent solutions on open platforms which do not transfer easily to other clinics, do not take advantage of the features of commercial workstations and cannot be easily ported to commercial platforms for operational use. Furthermore, the post-processing of images has been hampered by variations in the acquisition workflow and post-processed algorithms generally leading to difficulties in comparing results.

Therefore, there is a need for a system and a method for deploying software, e.g., software designed for acquisition and/or post-processing of images related to a particular molecular imaging agent.

SUMMARY OF THE INVENTION

In one embodiment, the present invention discloses a method and system for deploying software, e.g., software modules designed for acquisition and/or post-processing of images related to a particular imaging agent, e.g., a molecular imaging agent. The modules can be remotely accessed from a software server.

In one embodiment, a plurality of imaging workstations (e.g., clients) is in communication with one or more software servers via a network. The network can be an intranet or the internet. A plurality of acquisition and/or post-processing modules is stored at the software server. These software modules are created by one or more information sources or entities that have expertise or specific knowledge in the acquisition parameters and/or post-processing parameters associated with the use of a particular molecular imaging agent. By storing these modules in a software server that is easily accessible by a plurality of clients, the imaging workstations may download the latest acquisition and/or post-processing modules for use in an examination of a patient, where a particular molecular imaging agent has been selected. Since there are numerous imaging agents currently in use and many more to be developed, this novel approach allows rapid and efficient distribution of the latest acquisition parameters and/or post-processing parameters associated with the use of a particular molecular imaging agent.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention discloses a method and system for deploying configuration and/or analysis software. Although the present invention is described below in the context of deploying configuration and/or analysis software for conducting imaging examination using specialized agents, the present invention is not so limited. Namely, the present invention can be applied in other domains where one vendor manufactures a product that requires computer processing be done on another vendor's product over which the first manufacturer has little or no direct influence.

In one embodiment, the present invention provides for a system and method for conducting an imaging examination by a user using an imaging agent, e.g., a molecular imaging agent or a chemical compound in general. Generally, imaging agents are agents that will bind specifically to target molecules of interest. Examples of molecular agents include but are not limited to $^{18}$F-deoxyglucose (FDG) used in lymphoma cancer cells detection, $^{99m}$Tc-Annexin V used for imaging the process of apoptosis and so on. Typically, the imaging agents are useful in the detection of disease states. The system and method of the present invention assist in the deployment of software that will enhance and quantify the detected activity of the imaging agent. Specifically, the system and method of the present invention provide an efficient approach for distributing and deploying acquisition and/or post-processing software which enable the streamlining of data collection and enhancing the detected activity of the imaging agent.

In one embodiment, these acquisition and/or post-processing software are designed as individual software modules or units, e.g., "plug-in" applications that can be easily accessed by a user using a key or identifier associated with a particular imaging agent. The acquisition and post-processing software can be made available to the user via access to a software server. The software server and the acquisition and post-processing software are able to run on a variety of computer platforms without modification and provide a user with real-time resolution of any issues relating to particular imaging agent.

Figure 1:
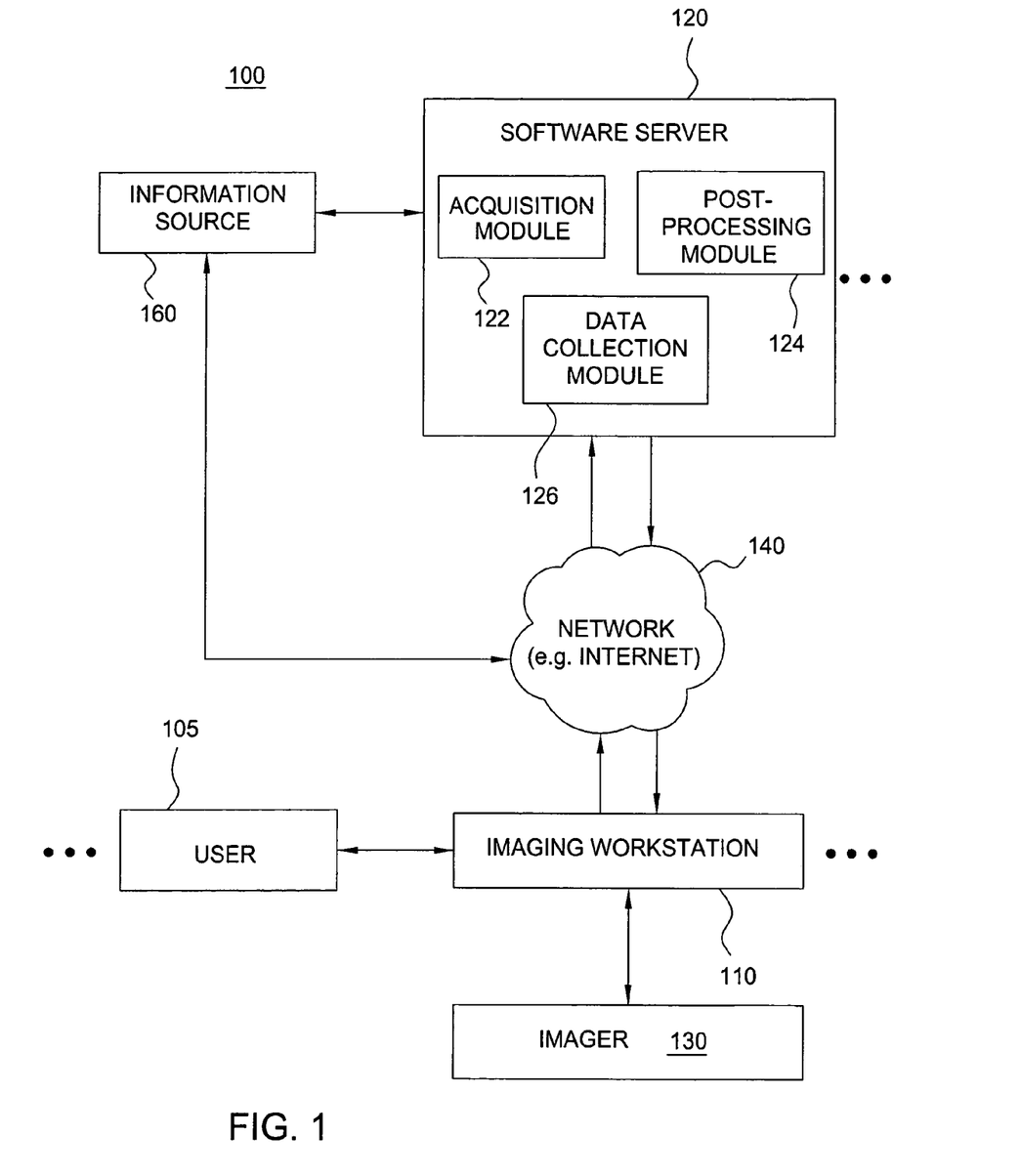
FIG. 1 illustrates a block diagram of an exemplary system of the present invention where a workstation interacts with a software server via a network.

FIG. 1 illustrates a block diagram of an exemplary system 100 of the present invention. In one embodiment, the system 100 comprises a software server 120 and a workstation 110, e.g., an imaging workstation. The software server 120 is able to communicate with the workstation 110 via a network 140, e.g., an intranet or the internet.

In operation, the software server 120 serves as a repository of a plurality of acquisition 122 and post-processing 124 software modules. The acquisition software is broadly defined as a software unit that can be deployed by a imaging workstation operating with an imager 130. Namely, the acquisition software unit may comprise acquisition parameters and/or procedures that best image a particular imaging agent for a particular imager 130. The post-processing software is broadly defined as a software that is employed to enhance the images produced from many of these imaging agents, and to quantify the activity level of the agents. In many cases the post processing methods are customized for a particular imaging agent.

In one embodiment, the acquisition modules 122 and the post-processing modules 124 can be in standardized form (for example, using extensible Markup Language (XML), Simple Object Access Protocol (SOAP), Web Services Description Language (WSDL), Universal Description, Discovery and Integration (UDDI), and Common Language Infrastructure (CLI)), and can be coupled with standardized classes for accessing data. Thus, in one embodiment, acquisition modules 122 and post-processing modules 124 can be run without modification on a wide range of platforms that have the infrastructure to interpret and run these standardized modules.

Generally, pharmaceutical companies are members of the information source 160 that are developing and manufacturing the imaging agents. In the present invention, these pharmaceutical companies can now distribute the acquisition recommendations and post-processing software in machine-readable form separate from the imaging agents themselves. Additionally, third parties may also be members of the information source 160. These third parties can be universities, research centers or simply users 105 that have acquired or developed acquisition recommendations and post-processing methods through extensive use or testing of the imaging agents. These third parties can now also create acquisition and/or post-processing modules that can be stored in the software server 120. This novel approach is far more efficient and organized than ad hoc mechanisms, such as "grass roots" sharing of ideas and software among the users of the agents, or letting the medical imaging manufacturers distribute the software as part of their workstation application.

Clearly as the number of imaging agents grows, such ad hoc distribution methods become problematic. The pharmaceutical company has no guarantee that the acquisition parameters and software needed to employ a particular imaging agent are available on the imaging workstations at the center where the examination or treatment is to be performed. Furthermore, since the pharmaceutical companies do not develop or service the imaging workstations where the software would be used, they are not in a position to have software installed on those workstations, or to collect use and outcome statistics. These criticalities are addressed by the present invention.

The software server 120 also comprises a data collection module 126. In one embodiment, the data collection module 126 collects outcome statistics. It should be noted that the post processing of the images often generates quantitative results. As in laboratory analysis, of keen interest is what constitutes normal and abnormal ranges of these quantitative results. Gathering statistics to compute these ranges has been hampered in the past because the variations in the acquisition workflow and post processing algorithms used lead to difficulties in comparing results. However, if all clinics, e.g., the workstations utilized the same acquisition workflows and post processing algorithms as disclosed in the present invention, collection of statistics for the computation of normal ranges could be simplified. In addition to aiding in calculation of normal ranges, the collection of usage statistics and outcomes can be very useful in further development and marketing of pharmaceuticals and the associated acquisition and post-processing software. Thus, in one embodiment, the present invention can optionally utilize a back channel to send usage and outcome data, properly anonymized, back to a central collection point 126, where it can be aggregated and searched. The collected data can be raw data taken directly from an examination using the imaging agent or processed data after post-processing has been applied to the raw data.

Although the software server 120 is illustrated as a single unit, the present invention is not so limited. Namely, a plurality of software servers can be deployed for easy access by a plurality of workstations 110. Although the present disclosure describes the present system using the terms "server" and "workstation", the present invention is not so limited. It should be noted that the software server can be implemented using any number of processing systems, e.g., a personal computer, a workstation, a server, a mainframe, an array of personal computers and the like. Similarly, it should be noted that the imaging workstation can be implemented using any number of processing systems, e.g., a personal computer, a workstation, a server, a controller deployed within the imager 130 and the like.

The operation of the present system is now described with reference to FIG. 1. User 105 can be any medical practitioner in charge of operating imaging workstation 110 and imager 130 (e.g., MRI, CT, PET and the like) to detect a disease state in a patient to which a molecular imaging agent will be administered to detect the disease state. User 105 operates imaging workstation 110 which is connected to software server 120 through a communication channel via network communication. In one embodiment, software server 120 is connected to the information source 160 through a direct communication channel. Alternatively, software server 120 is connected to the information source 160 through the network 140. Information source 160 is a source of data and information relating to one or more imaging agents and can include without limitation, a pharmaceutical company, a supplier of imaging agents of the type utilized by user 105, or a research entity which provides research data on imaging agents of the type used by user 105. Software server 120 receives data from the information source 160, and stores the data as one or more acquisition modules 122 and post-processing modules 124 which are specific to a particular imaging agent. Acquisition modules 122 and post-processing modules 124 can be accessed, e.g., via an identifier or key in a request received from the imaging workstation 110 to set-up the appropriate parameters for the examination for the benefit of user 105. Based on information received from the software server 120, imaging workstation 110 sets up work flow and processes the acquired data based on a particular imaging agent.

Figure 2:
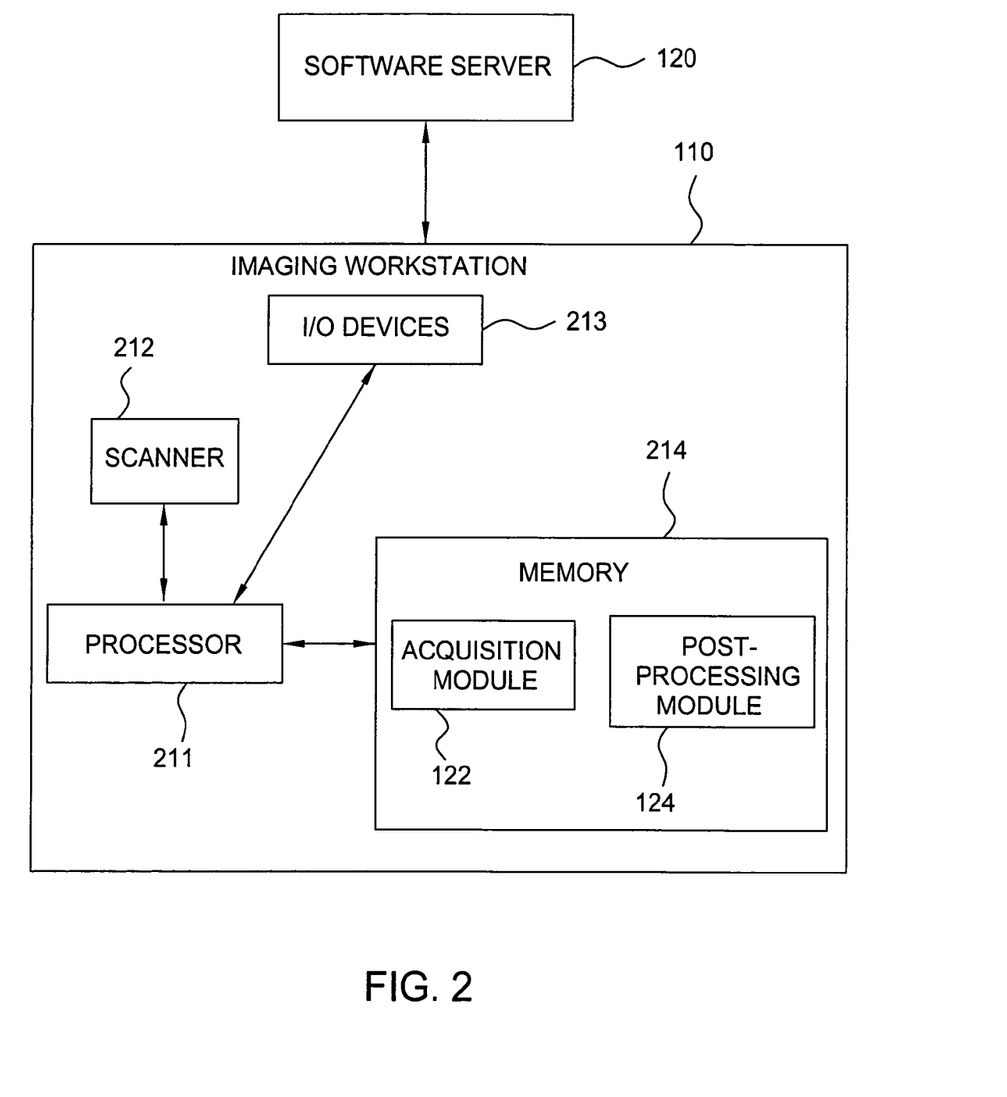
FIG. 2 illustrates a block diagram illustrating the workstation, e.g., an imaging workstation of FIG. 1 of the present invention.

FIG. 2 illustrates a block diagram of an exemplary imaging workstation 110 of the present invention. In one embodiment, the imaging workstation 110 is implemented using a general purpose computer or any other hardware equivalents. In one embodiment, the imaging workstation 110 comprises a processor (CPU) 211, a memory 214, e.g., random access memory (RAM) and/or read only memory (ROM), a scanner 212 (e.g., a bar code reader), and various input/output devices 213, (e.g., storage devices, including but not limited to, a tape drive, a floppy drive, a hard disk drive or a compact disk drive, a receiver, a transmitter, a speaker, a display, a clock, an output port, a user input device (such as a keyboard, a keypad, a mouse, and the like), or a microphone for capturing speech commands). It should be noted that the software server 120 can also be deployed using a general purpose computer similar to the imaging workstation 110.

In operation, a user may select a particular molecular agent to be used for a particular imager 130. In selecting the imaging agent, the user will enter a code or an identification associated with the imaging agent into the imaging workstation. In one embodiment, the scanner 212 is used to scan a code, e.g., a bar code located on the packaging of the molecular agent. Other scanner devices are contemplated, e.g., a scanner that can detect a radio frequency (RF) tag, can also be employed.

Once the imaging workstation has acquired the imaging agent identification, it will attempt to acquire the acquisition module 122 and/or post-processing module 124 from a software server. In one embodiment, each acquisition module 122 and post processing module 124 is tailored for use with a particular imaging agent and is obtained from software server 120 through the network and is stored in memory 214. In one embodiment, acquisition module 122 and post-processing module 124 can run without modification on imaging workstation 110 and a wide range of platforms. For example, the modules can be designed to operate across different operating environments and/or hardware configurations. Operating environments may include, but are not limited to, the type of operating systems (e.g., Microsoft Windows of Redmond, Wash., Linux (an open source system) and Mac OS 10, of Apple Computers of Cupertino, Calif.), the type of database environments, the type of communication environments and the like. Hardware configurations may include, but are not limited to, the type of computers (e.g., a personal computer (PC) and an Apple computer), the type of communication hardware, the type of input/output devices and the like. Once the pertinent software modules have been downloaded into memory 214, the user can perform the examination using a pertinent imager 130. Namely, based on information received from software server 120, imaging workstation 110 sets up work flow and processes the acquired data based on a particular molecular imaging agent. It should be noted that the information sent to the software server may include other pertinent information including the imaging agent identification. For example, it is contemplated that various patient information may also be sent as well, e.g., age, gender, weight, race, patient condition (e.g., disease state or type), examination type (e.g., examination procedure for a particular disease or a particular anatomical or physiological feature) and so on. For example, an imaging agent can be selected in combination with a particular examination procedure, a particular organ, a particular disease, and/or pertinent patient data. Thus, it is contemplated that there may be multiple acquisition modules that are associated with a particular imaging agent. Similarly, post-processing modules can be selected in combination with a particular imaging agent that was used in the examination, a particular examination procedure, a particular organ, a particular disease, and/or pertinent patient data. Thus, it is also contemplated that there may be multiple post-processing modules that are associated with a particular imaging agent. Therefore, such data may be used to assist in the selection of the proper acquisition module 122 and post-processing module 124.

Once the examination is concluded, the software on the imaging station can optionally utilize a back channel to send usage and outcome data, from imaging workstation 110 to software server 120, where it can be aggregated and searched and the information fed back to user 105 or to the information source 160. In one embodiment, the software server 120 can also track the number of downloads that have been made by a particular imaging workstation. This information can be used for accounting purposes such as billing the owner of a particular imaging workstation based on the number of downloads during a particular period.

Figure 3:
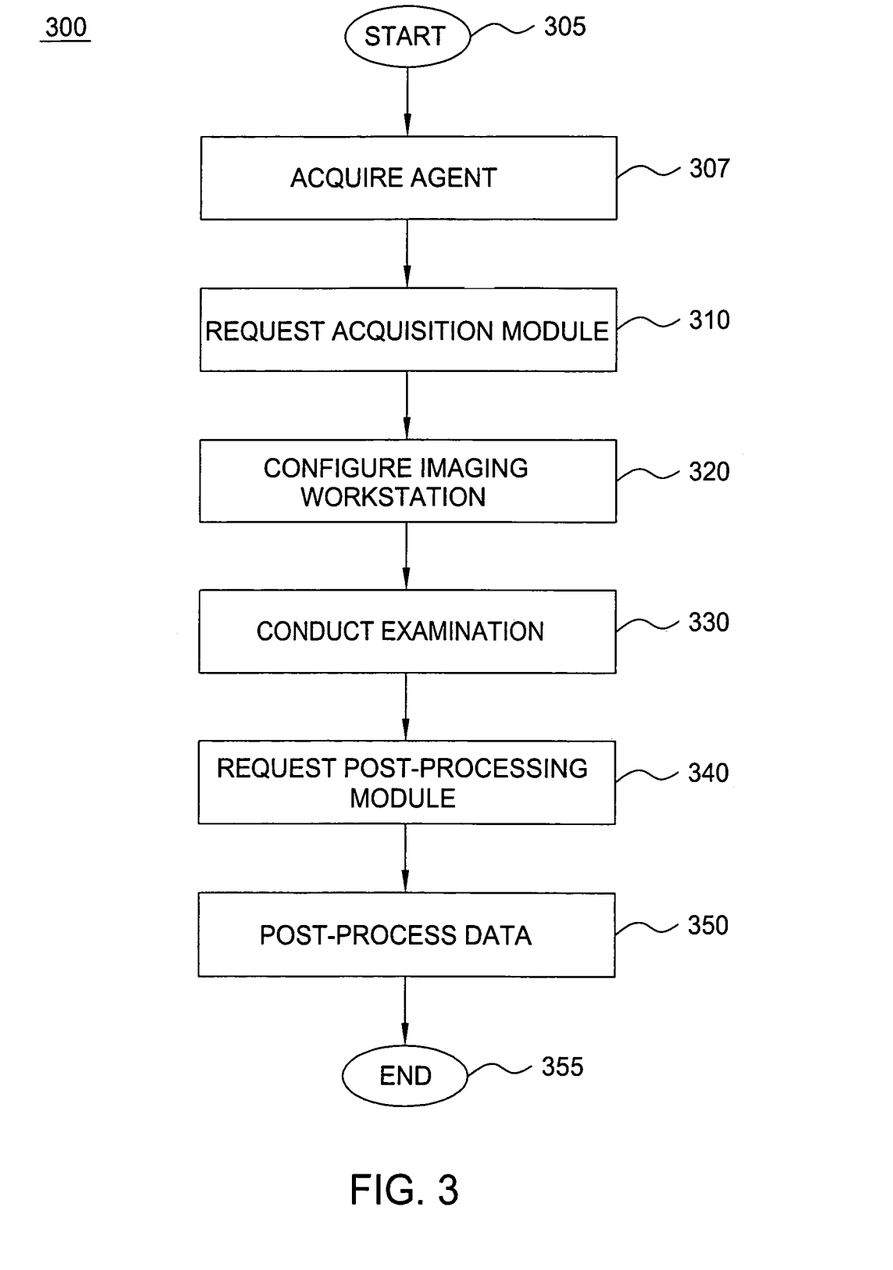
FIG. 3 illustrates a method for acquiring and deploying acquisition and/or post-processing modules from a remote location in accordance with the present invention.

FIG. 3 illustrates a method 300 for acquiring acquisition module, post-processing module and/or aggregated information from a remote location, e.g., software server 120. In one embodiment, the acquiring acquisition module, post-processing module and/or aggregated information relate to a particular imaging agent.

The method 300 starts in step 305 and proceeds to step 307. In step 307, a particular agent, e.g., a particular molecular imaging agent is acquired for use in an examination. The type of examination and/or the type of imager in use will dictate the use of a particular imaging agent.

In step 310, a request for the corresponding acquisition module associated with the selected agent is made. For example, having selected the molecular imaging agent, a user may communicate the identifier or key to the imaging workstation 110. In turn, the request is sent to the software server 120 via a network where the requested acquisition module (e.g., a set of acquisition parameters) is stored. Responsive to the request, the software server will forward the requested acquisition module to the imaging workstation 110.

In step 320, the requested acquisition module is received and used to configure the imaging workstation 110 and/or the imager 130 based on the acquisition parameters.

In step 330, following the configuration, the imaging workstation and the imager 130 operate to conduct the relevant examination. For example, the user 105 may operate the imaging workstation 110 and the imager 130 to conduct the examination and to collect the examination data.

In step 340, upon completion of the examination, a request for the corresponding of post-processing module associated with the selected agent is made. For example, having selected the molecular imaging agent, the imaging workstation 110 now has the identifier or key to the molecular imaging agent. In turn, the request is sent to the software server 120 via a network where the requested post-processing module (e.g., a set of post-processing parameters) is stored. Responsive to the request, the software server will forward the requested post-processing module to the imaging workstation 110. Although method 300 illustrates the steps of requesting the acquisition module and the post-processing module as separate steps, the present invention is not so limited. For example, both the acquisition module and the post-processing module can be obtained in a single request.

In step 350, method 300 applies the received post-processing parameters to process the collected data. For example, the user 105 post-processes the examination data and completes the examination and the method ends in step 355.

It should be noted that method 300 is described as having to make request for the acquisition module and the post-processing module for each examination. The present invention is not so limited. In an alternate embodiment, it is contemplated that if both the acquisition module and the post-processing module have already be downloaded, e.g., for use in an examination for a previous patient, then it is unnecessary to request for the acquisition module and/or the post-processing module repeatedly. The imaging workstation 110 can simply track or account for the number of times that the relevant acquisition module and/or the post-processing module have been used. This accounting information can be sent to the software server at a later time. This approach may avoid the need to communicate with the software server repeatedly, thereby alleviating delay and also improving reliability if the software server is not in operation for whatever reasons. Alternatively, the cost of the software modules can be built into the cost of the molecular imaging agent itself, such that the identification code of the molecular imaging agent is also used as an authorization code for accessing (e.g., locating and unlocking) software that the operator of the imaging workstation has already paid for when the molecular imaging agent was purchased.

Alternatively, each downloaded module may have a predefined number of applications, such that after the predefined number of applications have been exhausted, then it is necessary to download the modules again. The specific accounting implementation can be tailored to a particular arrangement between the operator of the imaging workstation and the operator of the software server.

Figure 4:
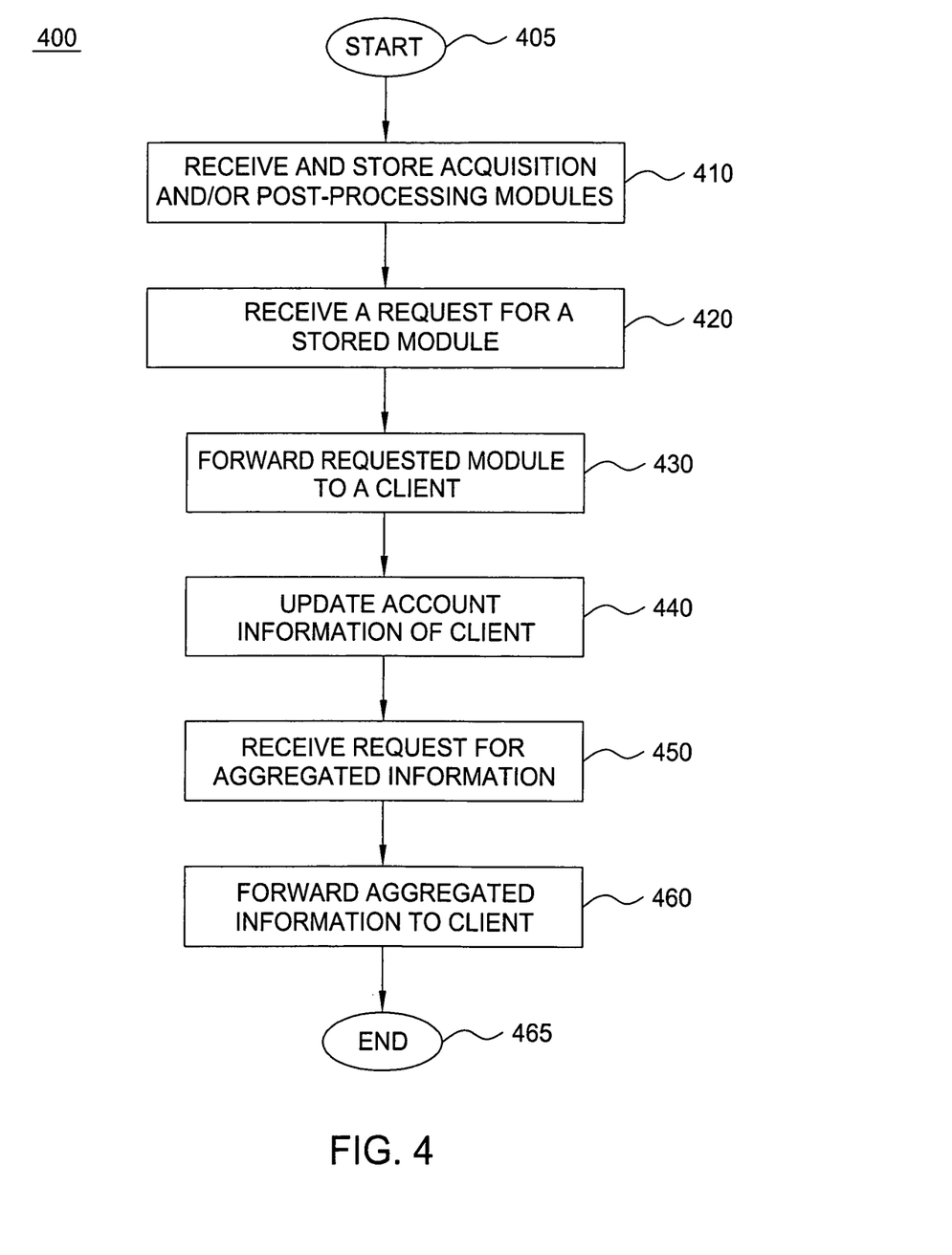
FIG. 4 illustrates a method for processing a request for an acquisition module, a post-processing module and/or aggregated information from a client in accordance with the present invention.

FIG. 4 illustrates a method 400 for processing a request for an acquisition module, a post-processing module and/or aggregated information from a client in accordance with the present invention. Namely, method 400 reflects the perspective from the software server 120 in servicing a plurality of clients, e.g., one or more imaging workstations 110 and/or one or more information sources 160.

Method 400 starts in step 405 and proceeds to step 410. In step 410, method 400 receives and stores a plurality of acquisition modules and/or post-processing modules. These modules are created "off-line" and are received from different sources, e.g., pharmaceutical companies, hospitals, universities, research labs, manufacturers of imagers, other clients and so on. Namely, these information sources 160 may have updated information or parameters associated with a particular imaging agent that can be embodied in various software modules that can be downloaded for use. The software modules are received and stored by the software server 120.

In step 420, method 400 receives a request for at least one stored module, e.g., an acquisition module and/or a post-processing module. The request may comprise an identifier associated with a particular molecule imaging agent. Alternatively, it may comprise the agent's identifier plus pertinent patient information.

In step 430, method 400 locates the requested module and forwards the requested module to the client, e.g., the imaging workstation 110. Depending on the specific implementation, the requested module can be retrieved via a look-up operation using the identifier associated with the particular molecule imaging agent. Alternatively, an evaluation may be performed on the pertinent patient information to properly select the pertinent module.

In step 440, method 400 updates account information of the client that made the request. For example, method 400 may record the type and the number of times that a particular module was forwarded to the client. As discussed above, there are various accounting methods that can be deployed. As such, this account updating step will be tailored in accordance with the agreed method of accounting between the operator of the software server and each client.

In step 450, method 400 may optionally receive a request for aggregated information. It is contemplated that each client may return collected or post-processed data back to the software server after the examination has been conducted using the relevant molecular imaging agent. The collected or post-processed data can be submitted where the personal information about the patient is removed. One reason is that the collected and post-processed data can be aggregated, searched and analyzed. It can also be provided to various information sources 160 that were responsible in generating the acquisition and/or post-processing modules. This aggregated information will allow the information sources 160 to analyze and update the relevant parameters in the modules, if necessary. The operator of the imaging workstation 110 may also want the aggregated information as well, e.g., how often a particular molecular imaging agent is used at large, how well did it perform, which is the preferred post-processing module for a particular molecular imaging agent, and so on.

In step 460, method 400 forwards the aggregated information to the requesting client. Method 400 then ends in step 465.

It should be understood that the methods 300 and 400 (or a subset of steps within the methods) as discussed above can be implemented in a general purpose computer, e.g., the workstation 110 and the software server 120. For example, these methods can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory of the computer (e.g., within the workstation 110 and the software server 120). As such, the methods of FIGS. 3 and 4 (including associated data structures) of the present invention can be stored on a computer readable medium, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for deploying at least one software module for highlighting particular cellular or molecular processes relating to a disease state, the method comprising:
   requesting, by an imaging workstation, said at least one software module associated with a molecular imaging chemical compound, the at least one software module including programming for targeting a particular disease state based on said molecular imaging chemical compound;
   receiving, by said imaging workstation, said at least one requested software module from a software server via a network;
   configuring, by said at least one software module, said imaging workstation to acquire or process an image capturing an activity of the molecular imaging chemical compound within a patient; and
   determining a disease state of the patent based on the captured activity.

2. The method of claim 1, wherein said at least one software module is an acquisition module comprising at least one acquisition parameter.

3. The method of claim 2, wherein
   configuring said imaging workstation is performed according to said requested software module and said at least one acquisition parameter received from said software server to enable control of an imager for imaging the molecular imaging chemical compound administered to the patient.

4. The method of claim 3, further comprising:
   conducting an examination using said molecular imaging chemical compound bound to target molecules of interest in the patient in accordance with said at least one acquisition parameter.

5. The method of claim 4, further comprising:
   forwarding collected data derived from said examination to said software server.

6. The method of claim 5, further comprising:
   requesting aggregated information from said software server.

7. The method of claim 2, wherein said acquisition module is a plug-in module.

8. The method of claim 1, wherein said at least one software module is a post processing module comprising at least one post processing parameter.

9. The method of claim 8, further comprising:
   processing data collected from an examination using said molecular imaging chemical compound bound to target molecules of interest in the patient in accordance with said at least one post processing parameter.

10. The method of claim 9, further comprising:
    forwarding said post processed data to said software server.

11. The method of claim 10, further comprising:
    requesting aggregated information from said software server.

12. The method of claim 8, wherein said post processing module is a plug-in module.

13. A method for distributing at least one software module for highlighting particular cellular or molecular processes relating to a disease state, the method comprising:
    storing at least one software module configured to acquire or process an image capturing an activity of a molecular imaging chemical compound within a patient, the at least one software module including programming for targeting a particular disease state based on said molecular imaging chemical compound;
    receiving a request for said at least one software module;
    forwarding said at least one requested software module to a client via a network;
    acquiring or processing an image capturing an activity of the imaging chemical compound within a patient; and
    determining a disease state of the patent based on the captured activity.

14. The method of claim 13, wherein said at least one software module is an acquisition module comprising at least one acquisition parameter.

15. The method of claim 14, further comprising:
    receiving collected data derived from an examination using said molecular imaging chemical compound bound to target molecules of interest in the patient in accordance with said to at least one acquisition parameter.

16. The method of claim 15, further comprising:
    sending aggregated information derived from said collected data to said client.

17. The method of claim 14, wherein said acquisition module is a plug-in module.

18. The method of claim 13, wherein said at least one software module is a post processing module comprising at least one post processing parameter.

19. The method of claim 18, further comprising:
    receiving post processed data from an examination using said molecular imaging chemical compound bound to target molecules of interest in the patient in accordance with said at least one post processing parameter.

20. The method of claim 19, further comprising:
    sending aggregated information derived from said post processed data to said client.

21. The method of claim 18, wherein said post processing module is a plug-in module.

22. An apparatus for deploying at least one software module for highlighting particular cellular or molecular processes relating to a disease state, comprising:
    means for requesting said at least one software module associated with a molecular imaging chemical compound, the at least one software module including programming for targeting a particular disease state based on said molecular imaging chemical compound;
    means for receiving said at least one requested software module from a software server via a network;
    an imaging workstation configured by said at least one software module to acquire or process an image capturing an activity of the molecular imaging chemical compound within a patient; and
    determining a disease state of the patent based on the captured activity.

23. The apparatus of claim 22, wherein said at least one software module is an acquisition module comprising at least one acquisition parameter.

24. The apparatus of claim 23, further comprising:
    means for configuring said imaging workstation according to said requested software module and said at least one acquisition parameter received from said software server to enable control of an imager for imaging the molecular imaging chemical compound administered to the patient.

25. The apparatus of claim 24, further comprising:
    means for conducting an examination using said molecular imaging chemical compound bound to target molecules of interest in the patient in accordance with said at least one acquisition parameter.

26. The apparatus of claim 25, further comprising:
means for forwarding collected data derived from said examination to said software server.

27. The apparatus of claim 26, further comprising:
means for requesting aggregated information from said software server.

28. The apparatus of claim 23, wherein said acquisition module is a plug-in module.

29. The apparatus of claim 22, wherein said at least one software module is a post processing module comprising at least one post processing parameter.

30. The apparatus of claim 29, further comprising:
means for processing data collected from an examination using said molecular imaging chemical compound bound to target molecules of interest in the patient in accordance with said at least one post processing parameter.

31. The apparatus of claim 30, further comprising:
means for forwarding said post processed data to said software server.

32. The apparatus of claim 29, wherein said post processing module is a plug-in module.

33. An apparatus for deploying at least one software module for highlighting particular cellular or molecular processes relating to a disease state, comprising:
an imager for collecting examination data of a molecular chemical compound bound to target molecules of interest in a patient, wherein the molecular imaging chemical compound is visible to the imager;
an imaging workstation in communication with the imager, the imaging workstation requesting said at least one software module associated with the molecular imaging chemical compound, and for receiving said at least one requested software module from a software server via a network, the at least one software module including programming for targeting a particular disease state based on said molecular imaging chemical compound,
wherein the imaging workstation implements a work flow for processing the examination data using a received software module and determining a disease state of the patent based on the processed examination data.

34. An apparatus for distributing at least one software module for highlighting particular cellular or molecular processes relating to a disease state, comprising:
means for storing at least one software module configured to acquire or process an image capturing an activity of a molecular chemical compound within a patient, the at least one software module including programming for targeting a particular disease state based on said molecular imaging chemical compound;
means for receiving a request for said at least one software module;
means for forwarding said at least one requested software module to a client via a network;
means for acquiring or processing an image capturing an activity of the imaging chemical compound within a patient; and
means for determining a disease state of the patent based on the captured activity.

35. The apparatus of claim 34, wherein said at least one software module is an acquisition module comprising at least one acquisition parameter.

36. The apparatus of claim 35, further comprising:
means for receiving collected data derived from an examination using said molecular imaging chemical compound bound to target molecules of interest in the patient in accordance with said to at least one acquisition parameter.

37. The apparatus of claim 36, further comprising:
means for sending aggregated information derived from said collected data to said client.

38. The apparatus of claim 35, wherein said acquisition module is a plug-in module.

39. The apparatus of claim 34, wherein said at least one software module is a post processing module comprising at least one post processing parameter.

40. The apparatus of claim 39, further comprising:
means for receiving post processed data from an examination using said molecular imaging chemical compound bound to target molecules of interest in the patient in accordance with said at least one post processing parameter.

41. The apparatus of claim 40, further comprising: means for sending aggregated information derived from said post processed data to said client.

42. The apparatus of claim 39, wherein said post processing module is a plug-in module.

43. A computer-readable medium having stored thereon a plurality of instructions, the plurality of instructions including instructions which, when executed by a processor, cause the processor to perform the steps of a method for deploying at least one software module for highlighting particular cellular or molecular processes relating to a disease state, comprising of:
requesting, by an imaging workstation, said at least one software module associated with a molecular imaging chemical compound, the at least one software module including programming for targeting a particular disease state based on said molecular imaging chemical compound;
receiving, by said imaging workstation, said at least one requested software module from a software server via a network;
configuring, by said at least one software module, said imaging workstation to acquire or process an image capturing an activity of the molecular imaging chemical compound within a patient; and
determining a disease state of the patent based on the captured activity.

44. The computer-readable medium of claim 43, wherein said at least one software module is an acquisition module comprising at least one acquisition parameter.

45. The computer-readable medium of claim 44, wherein configuring said imaging workstation is performed according to said requested software module and said at least one acquisition parameter received from said software server to enable control of an imager for imaging the molecular imaging chemical compound administered to the patient.

46. The computer-readable medium of claim 45, further comprising:
conducting an examination using said molecular imaging chemical compound bound to target molecules of interest in the patient in accordance with said at least one acquisition parameter.

47. The computer-readable medium of claim 46, further comprising:
forwarding collected data derived from said examination to said software server.

48. The computer-readable medium of claim 47, further comprising:
    requesting aggregated information from said software server.

49. The computer-readable medium of claim 44, wherein said acquisition module is a plug-in module.

50. The computer-readable medium of claim 43, wherein said at least one software module is a post processing module comprising at least one post processing parameter.

51. The computer-readable medium of claim 50, further comprising:
    processing data collected from an examination using said molecular imaging chemical compound bound to target molecules of interest in the patient in accordance with said at least one post processing parameter.

52. The computer-readable medium of claim 51, further comprising:
    forwarding said post processed data to said software server.

53. The computer-readable medium of claim 52, further comprising:
    requesting aggregated information from said software server.

54. The computer-readable medium of claim 50, wherein said post processing module is a plug-in module.

55. A computer-readable medium having stored thereon a plurality of instructions, the plurality of instructions including instructions which, when executed by a processor, cause the processor to perform the steps of a method for distributing at least one software module for highlighting particular cellular or molecular processes relating to a disease state, comprising of:
    storing at least one software module configured to acquire or process an image capturing an activity of a molecular chemical compound within a patient, the at least one software module including programming for targeting a particular disease state based on said molecular imaging chemical compound;
    receiving a request for said at least one software module;
    forwarding said at least one requested software module to a client via a network;
    acquiring or processing an image capturing an activity of the imaging chemical compound within a patient; and
    determining a disease state of the patent based on the captured activity.

56. The computer-readable medium of claim 55, wherein said at least one software module is an acquisition module comprising at least one acquisition parameter.

57. The computer-readable medium of claim 56, further comprising:
    receiving collected data derived from an examination using said molecular imaging chemical compound bound to target molecules of interest in the patient in accordance with said to at least one acquisition parameter.

58. The computer-readable medium of claim 57, further comprising:
    sending aggregated information derived from said collected data to said client.

59. The computer-readable medium of claim 56, wherein said acquisition module is a plug-in module.

60. The computer-readable medium of claim 55, wherein said at least one software module is a post processing module comprising at least one post processing parameter.

61. The computer-readable medium of claim 60, further comprising:
    receiving post processed data from an examination using said molecular imaging chemical compound bound to target molecules of interest in the patient in accordance with said at least one post processing parameter.

62. The computer-readable medium of claim 61, further comprising:
    sending aggregated information derived from said post processed data to said client.

63. The computer-readable medium of claim 60, wherein said post processing module is a plug-in module.

* * * * *